Dec. 10, 1946.　　　E. E. TURNER, JR　　　2,412,234
APPARATUS FOR ECHO DISTANCE MEASUREMENT
Original Filed Jan. 5, 1940　　3 Sheets-Sheet 1
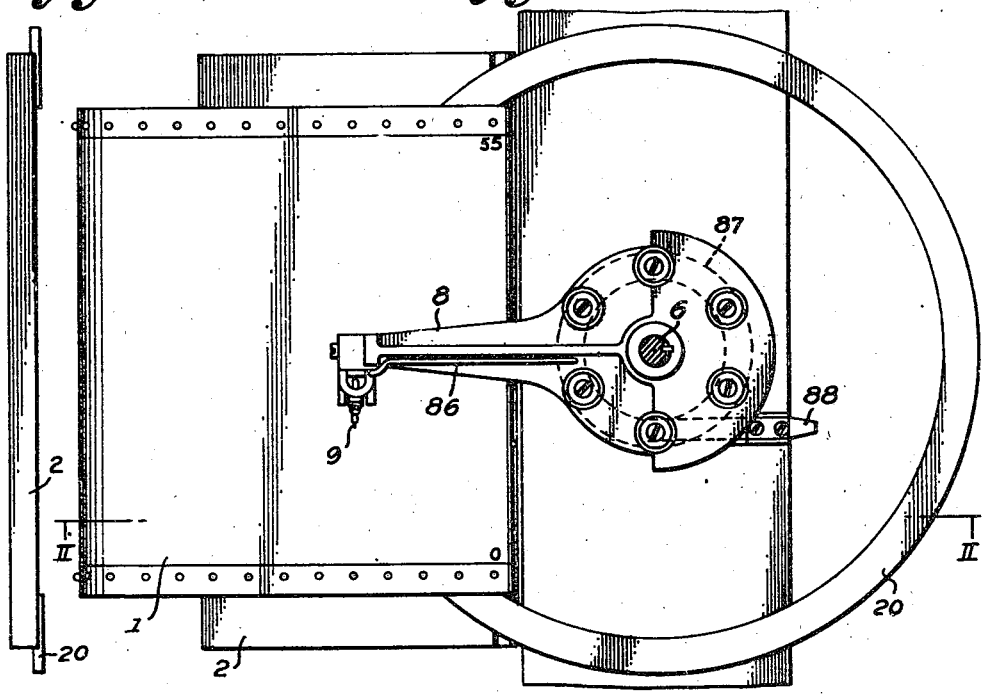
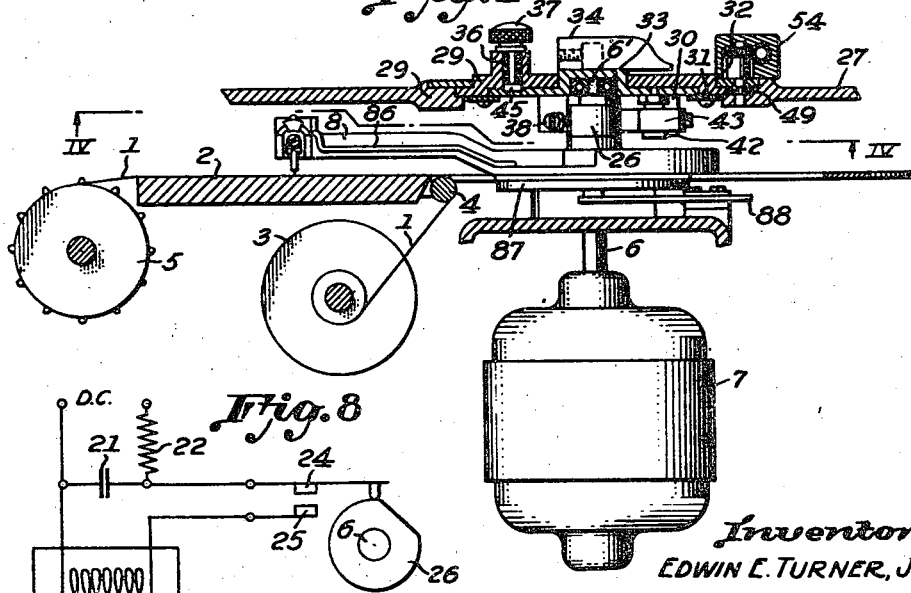
COMPRESSIONAL WAVE
PRODUCING DEVICE
Inventor.
EDWIN E. TURNER, JR.
By
Attorneys.

Dec. 10, 1946.    E. E. TURNER, JR    2,412,234
APPARATUS FOR ECHO DISTANCE MEASUREMENT
Original Filed Jan. 5, 1940    3 Sheets-Sheet 2
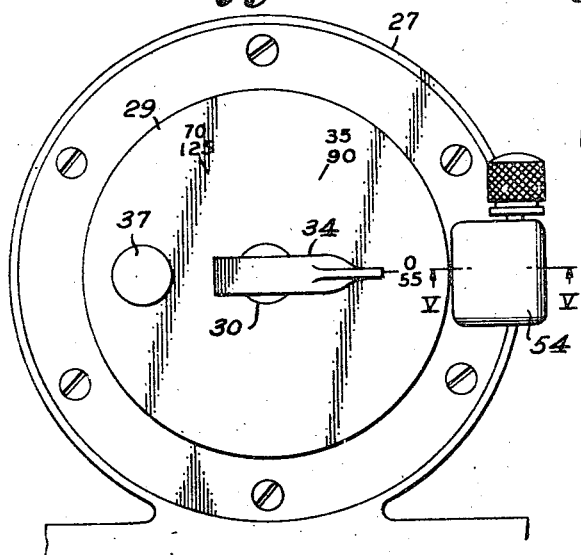
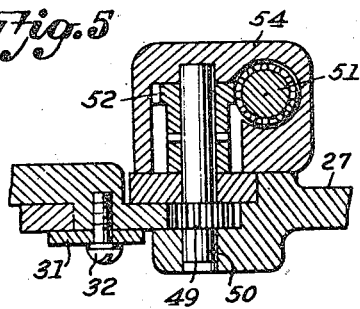
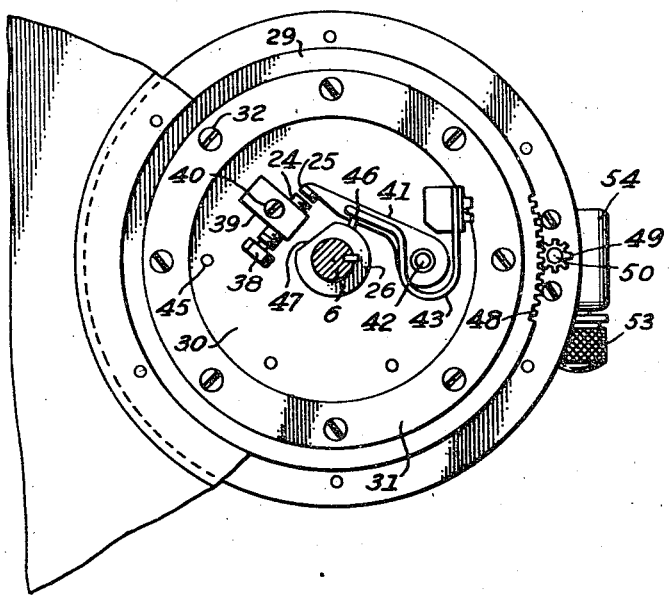
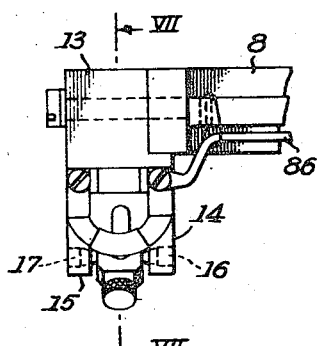
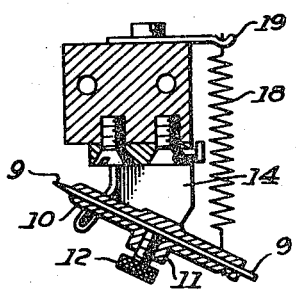
Inventor:
EDWIN E. TURNER, JR.
By Ezekiel Wolf
Attorneys.

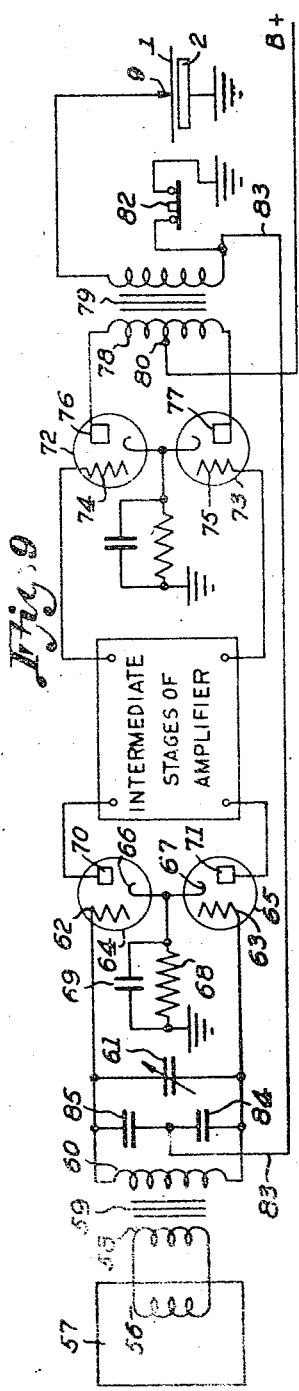
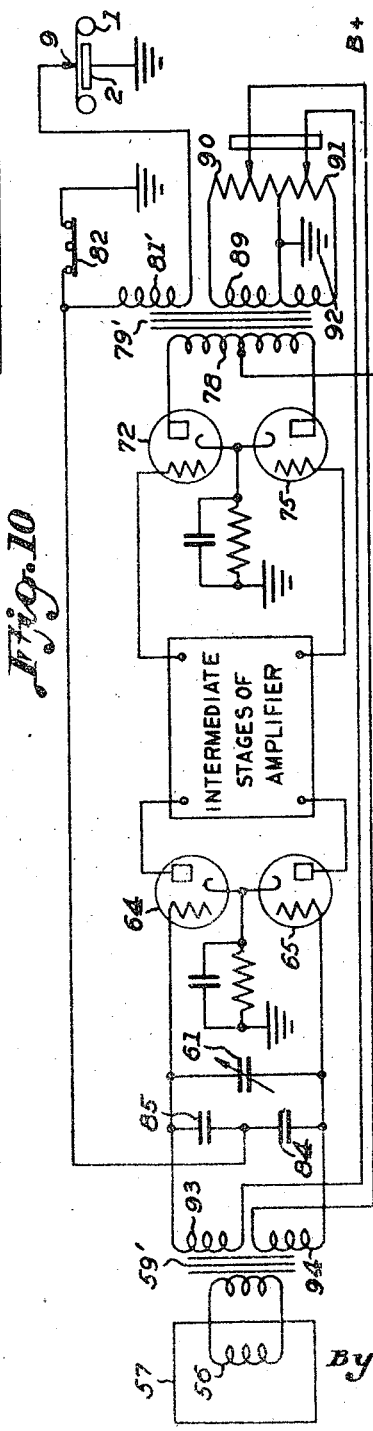
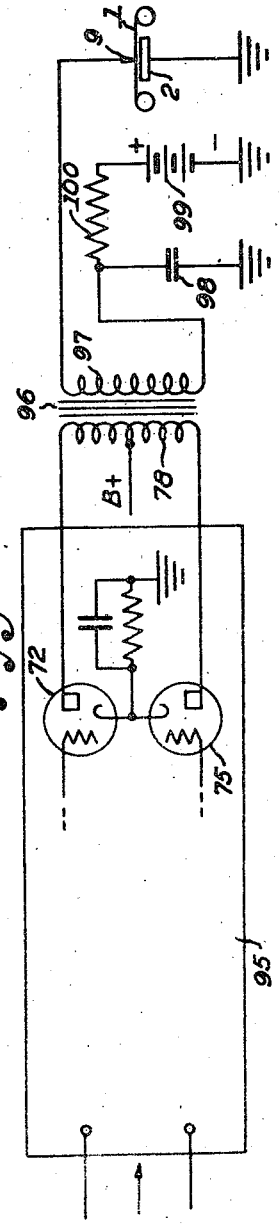

Patented Dec. 10, 1946

UNITED STATES PATENT OFFICE 2,412,234

APPARATUS FOR ECHO DISTANCE MEASUREMENT

Edwin E. Turner, Jr., West Roxbury, Mass., assignor, by mesne assignments, to Submarine Signal Company, Boston, Mass., a corporation of Delaware Original application January 5, 1940, Serial No. 312,504. Divided and this application November 22, 1940, Serial No. 366,637

2 Claims. (Cl. 177—386)

The present application is a division of my copending application Serial No. 312,504, filed January 5, 1940.

The present invention relates to echo distance measuring systems and to recording apparatus therefor.

The general principle of echo distance measurement and depth sounding is well known. A compressional wave impulse is transmitted to the water and the reflected signal is received and used to operate an indicator. The time interval between the emitted signal and the received echo is a measure of the distance or depth. This time interval is frequently measured by comparing it with a constant known speed. Thus where a record of the depth is desired, a marking element is usually moved at a constant speed over a chart, a signal impulse being emitted at the instant the marking point crosses a zero line on the chart and a mark being made on the chart at the instant the echo is received. If the chart be continuously advanced between soundings, the record of the successive periodic measurements will form a graph of the depths traversed. Recording instruments of this type have heretofore been used with more or less success.

The present invention provides, among other things, an improved depth sounding recorder which is particularly adapted for the measurement of both shallow and deeper depths and which, furthermore, produces a record of greater accuracy. It is, moreover, arranged to provide a rugged and serviceable construction.

The various features and objects of the present invention will best be understood from the following description taken with reference to the accompanying drawings in which Fig. 1 shows a plan view of the record chart and marking element; Fig. 1a is an end elevation of the marking platen; Fig. 2 is a partial section on line II—II of the arrangement shown in Fig. 1 and including also the range-shifting mechanism; Fig. 3 is a front elevation of the scale-shifting mechanism; Fig. 4 is a section of Fig. 2 taken along the line IV—IV and may be regarded as a back elevation of a portion of the range-shifting mechanism; Fig. 5 is an enlarged cross section of the zero adjustment taken along the line V—V in Fig. 3; Fig. 6 is an enlarged plan view of the marking stylus holder; Fig. 7 is an enlarged section of the same; Fig. 8 is a schematic wiring diagram of the transmitting circuit; Fig. 9 is a schematic wiring diagram of a receiving circuit; Fig. 10 is a schematic wiring diagram of a modified receiving circuit providing a sensitvity control; and Fig. 11 is a schematic wiring diagram of a further modification of the receiving circuit providing an automatic sensitivity control.

As shown in Figs. 1 and 2 a chart or record paper 1 is passed over a platen 2 of conducting material from the roll 3 over an idling roller 4 to a take-up spool 5. The take-up spool 5 may be rotated by suitable gearing, or the like, connected to the motor 7 or by an independent rotating mechanism as is well known in the art. Mounted on a shaft 6 rotated at a constant speed by motor 7 is an arm 8 which carries the marking stylus 9. The motor 7, while shown for simplicity as being directly connected to the arm 8, may, of course, be coupled to it through suitable gearing if desired. The record paper is preferably of the type having a conductive carbon back with a thin light-colored coating on its front surface which is removed by the passage of an electric current through the paper. As will more fully appear, the current is passed from the stylus 9 through the paper 1 to the platen 2. Since the stylus itself is not required to do any work, it is only necessary that it remain lightly in contact with the paper at all times during its passage across the paper. The stylus is therefore in the form of a fine wire which is lightly pressed against the paper. The stylus holder can be seen in Fig. 2 and in the enlarged views of Figs. 6 and 7. The fine wire forming the stylus 9 is passed through a small hole in a cylindrical member 10 which is provided with a collar 11 at the center of mass of the member 10. A thumb screw 12 passing through the collar and into the member 10 serves to hold the stylus wire in position. As the marking end of the wire wears away, readjustment can readily be made by loosening the screw 12 and pushing the wire 9 farther through the member 10 until the desired point is again obtained.

The rotating arm 8 is provided at its end with a block 13 to which two plates 14 and 15 are fastened. These are provided with pivots 16 and 17 which engage the collar 11 to support the stylus on the arm 8. A light spring 18 fastened to the bottom end of the stylus holder 10 and to an extension 19 fastened to the block 13 provides the necessary tension to press the stylus against the paper. The spring, moreover, serves to make good electrical connection between the stylus and conductor 86 which is connected to a slip ring 87 insulated from the arm and the shaft.

In measuring shallow depths it is necessary to move the stylus across the chart paper very rapidly. Since the stylus is mounted at the end of the rotating arm 8, the stylus will describe a circle and will only periodically pass across the paper. In order to avoid any bouncing or chattering of the stylus as it moves across the chart a circular track 20 is provided against which the stylus bears while it is off the paper. The track 20 is fastened to or made integral with the platen 2. The latter is grooved slightly as shown in Fig. 1a, so that the surface of the paper lies in the same plane or very slightly below the surface of the track 20 and the edges of the platen. By this means the stylus rides onto the paper without any vibration and tearing of the edges of the paper is wholly avoided.

If a signal is emitted each time the marking point crosses the zero line, the maximum depth which can be recorded is that which corresponds to a time of travel of the wave from the ship to the bottom and back equal to the time required for the point 9 to move from the zero line to the line 55 at the opposite edge of the chart. In order to make it possible to use the instrument for deeper depths provision is made whereby the scale represented by the chart can be changed to include different depth ranges.

This involves the transmitting circuit shown in Fig. 8. A condenser 21 is charged from a source of direct current through a charging resistor 22. When a signal is to be transmitted, the capacitor 21 is discharged through the windings 23 of a compressional wave producing device by the closing of contacts 24 and 25 through the operation of a cam 26 fixed to the rotating shaft 6 which also carries the marker arm 8. Thus a signal will be transmitted once during each revolution of the arm 8.

Zero adjustment and range selection are accomplished by varying the position of the contacts 24, 25 with respect to the cam 26 whose position bears a definite relation to the position of the stylus-carrying arm 8. The arrangement is shown in more detail in Figs. 2 to 5.

In the upper part of a frame 27 which may be a portion of the housing of the recorder there is formed a circular aperture concentric with the axis of the shaft 6. The edges of the frame 27 at the aperture are thickened as at 28. The thickened portion is provided with an annular recess into which a flanged plate 29 is fitted. The plate 29 is provided with a central aperture and a recess on its inner side into which the flanged plate 30 is held by a supporting ring 31 and screws 32. The plate 30 carries ball bearing 33 forming the upper support for the end 6' of the shaft 6. The plate 30 is sufficiently loosely fitted into the plate 29 so that the plate 30 is rotatable by means of the knob 34. The plate 30 can, however, be locked in a series of predetermined positions by means of a pin 45 which is by means of spring 36 pressed into apertures in the plate 30 which are spaced to correspond to the predetermined positions above mentioned. When it is desired to rotate the plate 30 to a new position, the pin 45 is released by pulling upwards on the knurled knob 37 (Fig. 2). The plate 30 carries the contact mechanism which is best seen in Fig. 4. Contact 25 is fixed to the plate 30 as by the screw 38 and the block 39 which is mounted on the plate 30 by the screw 40. The movable contact 24 is mounted on an arm 41 pivoted at 42. A spring 43 fixed to the plate 30 by means of the bracket 44 serves to tension the contact 24 against contact 25. The contacts, which are suitably insulated from each other, are operated by the cam-follower 46 which is fixed to the arm 41 and which bears against the cam 26. The cam 26 may be circular with a flat portion 47 as shown in Fig. 4. When the follower 46 is in contact with the flat portion 47 of the cam, the contacts 24 and 25 are closed whereas during the remaining portion of the revolution of the cam 26 the contacts remain open. The cam 26 is positioned on the shaft 6 in such a way with respect to the marking arm 8 that a signal is normally transmitted at the instant the marking stylus 9 crosses the zero line on the chart 1.

Assuming that the time of travel of the stylus 9 across the chart corresponds to a depth of 55 feet it will be evident that in order to record depths greater than 55 feet the outgoing signal must be emitted prior to the instant at which the stylus 9 crosses the zero line. A second depth range of, say, 35 to 90 feet may, therefore, be chosen. The outgoing signal is produced at the proper instant for this purpose by rotating the plate 30 by means of the knob 34 carrying the contact assembly through an angle equal to the angle traversed by the stylus 9 between the zero and 35 foot lines on the chart. The cam follower 46 is thereby rotated with respect to the cam 26 so that the outgoing signal will be produced at the proper instant.

Other depth ranges can be provided in a similar manner, the contact position being shifted with respect to the cam as predetermined by the location of the holes in the plate 30 which are engaged by the pin 45. The knob 34 may also serve as a pointer to indicate the depth range selected, the ranges being engraved on the plate 29 as shown in Fig. 3.

In order to provide a zero adjustment the plate 29 has a plurality of teeth 48 cut in a portion of its periphery, the teeth being engaged by a pinion 49 whose shaft 50 is driven by a gear 52 and a worm 51 which is rotatable by the knob 53. This arrangement is best shown in Figs. 4 and 5. The worm 51 and gear 52 are mounted in a housing 54 which is fixed to the frame or case 27 of the instrument.

Fig. 9 shows the receiving circuit for causing the returning echo to produce a mark on the record paper. A compressional wave receiver having a voltage generating coil 56 is schematically indicated at 57. The coil 56 is connected to the primary winding 58 of an amplifier input transformer 59 having a secondary winding 60. The output of the secondary 60, shunted by the tuning condenser 61, is impressed upon the grids 62 and 63 of amplifier tubes 64 and 65, respectively, connected in push pull. The cathodes 66 and 67 of these tubes are grounded through resistor 68 and capacitor 69. The anodes 70 and 71 of the two tubes are connected through intermediate amplifier stages to the grids 74 and 75 of the last stage indicated at 72 and 73. In each stage the cathodes are grounded through a resistor and capacitor as in the case of the first stage. The anodes 76 and 77 are connected across the primary 78 of the output transformer 79. The anodes are provided with a potential by means of the center tap connection 80 on the primary 78 which is connected to the positive terminal of the plate supply source, the negative terminal being grounded. One end of the secondary winding 81 of the output transformer is connected to the marking stylus 9, the other terminal being connected through the push button type normally closed switch 82 to ground.

The stylus circuit is completed to ground through the paper 1 and the platen 2 which is grounded. It will be noted that a portion of the output potential from the secondary 81 is fed back by means of the lead 83 to the common terminal of two series connected capacitors 84 and 85 shunted across the secondary 60 of the input transformer. By this means it is possible by depressing the push button 82 and thereby opening the secondary to ground circuit to throw the amplifier into oscillation and thereby to cause the stylus to make a mark continuously across the paper. Such marks (often called "fix" marks) are useful in hydrographic survey work where it is often desired to indicate the precise moment at which the survey vessel leaves a known position. The push-pull amplifier not only provides an amplifier of very high sensitivity and gain but also provides a great freedom from stray signals. Furthermore, it makes possible the simple arrangement just described for making "fix" marks without causing any instability in the amplifier.

A modification of the receiving amplifier circuit is shown in Fig. 10. The amplifier as shown in this figure is substantially the same and similar parts have been given the same reference numerals as that shown in Fig. 9. However, the secondary of the input transformer here numbered 59' is formed of two separate windings 93 and 94 and the secondary of the output transformer here numbered 79' has in addition to the stylus operating winding 81', a center-tapped winding 89 across which are connected two similar series-connected variable potentiometer-type resistors 90 and 91. The common terminal of the resistors is connected to the center tap of the winding 89, the connection being grounded at 92. The variable contacts of resistors 90 and 91 which are operated in unison are connected, respectively, to the two windings 93 and 94 of the input transformer. By this means a variable negative feed-back is provided which controls the amplifier sensitivity and sharpness of the tuning. This modification provides a sensitivity control which simultaneously reduces the sharpness of the tuning of the amplifier, thereby broadening its resonance curve with decrease in sensitivity. Therefore, for shallow depths where the echo impulse is of relatively high intensity sufficient voltage will nevertheless be built up to operate the indicator here shown as the marking stylus. However, due to the broadening of the amplifier resonance curve the time required for the amplifier to build up to a sufficient potential to operate the indicator is reduced. Consequently the error which the amplifier's time delay otherwise introduces into the measurement is considerably reduced. Although this error is relatively small, it becomes of importance where very small depths are to be measured.

It will readily be understood by those skilled in the art that this variable negative feed-back arrangement can be used to provide a sensitivity control for single-sided amplifiers as well as for the push-pull amplifier here shown. It can also obviously be applied to other types of indicators in addition to the recording stylus herein shown.

A further modification of the receiving circuit is shown in Fig. 11. In this arrangement an automatic sensitivity control is provided which automatically varies the sensitivity in accordance with the length of time interval being measured. In this figure the amplifier is indicated at 95, only the output circuit of the last stage being shown.

The output transformer 96 has one terminal of its secondary 97 connected to the recorder stylus 9. The other terminal of the secondary 97 is connected to ground through a capacitor 98. The latter is maintained in a discharged state by the contact of the stylus 9 with the plate 2 or the track 20 which in this case may be made of a conducting material. When the stylus 9 travels on to the surface of the record paper 1, the capacitor 98 gradually becomes charged by the battery 99 which is in series with the resistance 100. The other terminal of the resistor 100 is connected to one side of the capacitor 98, the remaining terminals of both capacitor and battery being connected to ground as indicated. The polarity of the battery is so arranged that the potential across the condenser which is in series with the secondary 97 will aid the signal impulse potential in providing enough potential to cause the stylus 9 to make a mark on the paper. Thus when short distances are being measured and the reflected impulse has a relatively high intensity, there will be substantially no charge on the condenser. On the other hand, as the depth and the time interval being measured increase, the echo impulse intensity and the intensity of the potential produced thereby in the secondary 97 will decrease but the condenser 98 will provide an increasingly large potential in aid of the echo impulse potential.

It will be understood that this arrangement can also be applied to other types of indicators, for example, to an electric discharge tube indicator provided that suitable means are supplied for discharging the condenser 98 prior to each time interval measurement. This can readily be accomplished by a simple contact connected to the timing mechanism.

Having now described my invention, I claim:

1. In a recorder for echo distance measuring systems having a record paper, a stylus and means moving the same repeatedly across the paper at a constant speed, means for varying the range of distances recorded on said paper including contact means adapted, when operated, to effect production of a signal impulse, cam means for operating said contacts, said cam being mounted on an axis rotated at a speed proportional to the speed of said stylus moving means, a panel having a substantially circular aperture therein positioned with its center on said axis extended, a ring rotatably mounted on said panel in said aperture, a circular plate adapted to fit into said ring, means rotatably mounting said plate in said ring, means mounting said contact means fixedly on said plate and positioned to be operated by said cam, manually operable means for rotating said plate within said ring and thereby rotating said contact means relatively to said cam, means for locking said plate in said ring in a plurality of predetermined positions each corresponding to a range of distances to be recorded and independently manually operable means for rotating said ring in said panel and thereby said plate and contact means for providing accurate synchronization between the instant of production of the signal and the instant the stylus crosses a predetermined line on the record paper.

2. In a recorder for echo distance measuring systems having a record paper, a stylus and means moving the same repeatedly across the paper at a constant speed, means for varying the range of distances recorded on said paper including contact means adapted, when operated, to effect production of a signal impulse, cam means for operating said contacts, said cam being mounted on an axis rotated at a speed proportional to the speed of said stylus moving means, a panel having a substantially circular aperture therein positioned with its center on said axis extended, a ring rotatably mounted on said panel in said aperture, a circular plate adapted to fit into said ring, means rotatably mounting said plate in said ring, means mounting said contact means fixedly on said plate and positioned to be operated by said cam, manually operable means for rotating said plate within said ring and thereby rotating said contact means relatively to said cam, means for locking said plate in said ring in a plurality of predetermined positions each corresponding to a range of distances to be recorded and independently manually operable means for rotating said ring in said panel and thereby said plate and contact means for providing accurate synchronization between the instant of production of the signal and the instant the stylus crosses a predetermined line on the record paper comprising a plurality of gear teeth cut in a segment of the periphery of said ring and a rotatable worm gear mounted on said panel and adapted to engage said teeth on said ring.

EDWIN E. TURNER, Jr.